United States Patent [19]

Magill

[11] 3,841,103

[45] Oct. 15, 1974

[54] CURRENT STABILIZING MEANS FOR ISLAND AIRPORT FOUNDATIONS

[76] Inventor: John W. Magill, Chicago, Ill.

[22] Filed: Sept. 11, 1972

[21] Appl. No.: 287,906

[52] U.S. Cl............................... 61/46, 61/1, 61/35
[51] Int. Cl................................................ E02b 1/00
[58] Field of Search............... 61/1, 50, 46, 3, 4, 35, 61/63, 52; 14/1; 404/1, 71

[56] References Cited
UNITED STATES PATENTS 2,608,065   8/1952   Kubach..................................... 61/4

3,680,320   8/1972   Goodboy, Jr. et al................. 61/46

Primary Examiner—W. C. Reynolds
Assistant Examiner—Philip C. Kannan
Attorney, Agent, or Firm—Norman H. Gerlach

[57]   ABSTRACT

Current stabilizing means for island airport foundations and which consist of large diameter prestressed concrete conduits which project completely through the foundation in the vicinity of the water line and in the direction of normal water flow past the foundation, together with means for assisting the flow of water through such conduits.

3 Claims, 3 Drawing Figures

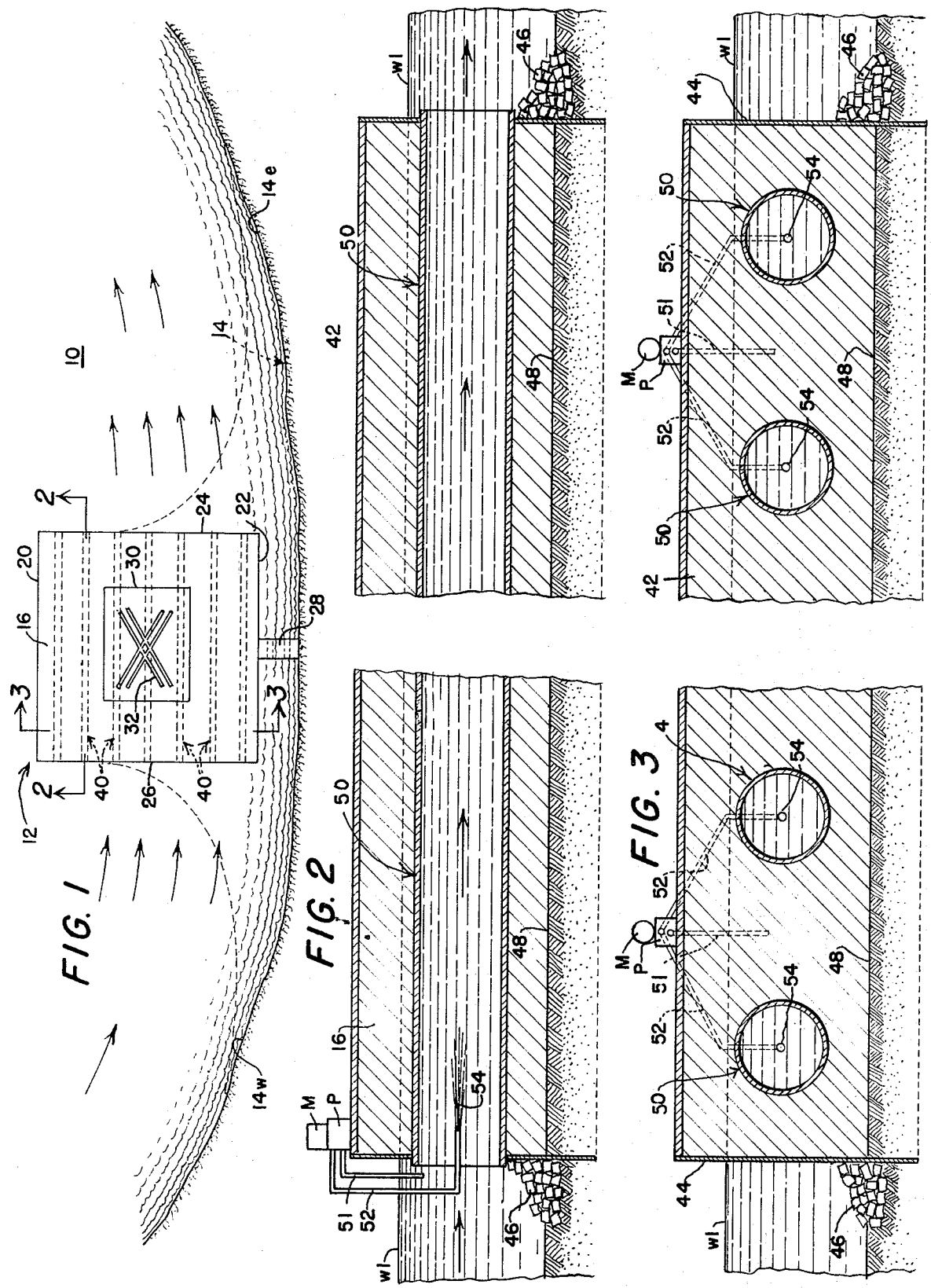

CURRENT STABILIZING MEANS FOR ISLAND AIRPORT FOUNDATIONS

The present invention relates to island airports which are partially or completely surrounded by water, the invention being particularly applicable to airports which have their foundations constructed in large bodies of flowing water, particularly lakes such as the Great Lakes of the United States which are disposed at or near the Canadian border. Exemplary of such a body of water is Lake Erie which has what may be considered a collective water inlet near the mouths of the St. Clair and Detroit rivers, and a water outlet at the Niagra river where it discharges into Lake Ontario. Water thus flows through the lake from one end thereof to the other, such flow being relatively gradual and on the order of from ½ to 1 mile per hour.

It has been proposed that at certain shore line locations along Lake Erie, island airports be constructed, such an airport currently being considered for the city of Cleveland. Such an airport, if completed, will consist of a large, substantially square foundation having lateral dimensions on the order of 4 miles, the foundation being connected to the shore by a narrow causeway having a length slightly less than one mile.

Numerous objections have been raised to the construction of such an airport, particularly by shore line landholders on opposite sides of the causeway. It is considered as a result of various engineering surveys that the contention of the landholders that an island airport will obstruct the normal flow of water along the shore line is well founded, and that, despite the slow rate of water flow, land accretion will, in time have a serious deleterious effect on such shore line property. Reduced scale artificial installations have shown that an accumulation of silt will take place as the water is slowed down and huge depositions of sand will take place along the shore line and finally build up to a width of hundreds of feet offshore.

The present invention is designed to overcome the abovenoted objections which have been raised against the construction of island airports within flowing bodies of water and, toward this end, the invention contemplates the provision of a novel current stabilising means for such an airport wherein large prestressed concrete conduits are embedded within the airport foundation, as well as within the causeway, and serve to preserve the normal flow of water along the shoreline that ordinarily would take place in the absence of an island airport. In order to overcome the frictional drag which ordinarily would inhibit the flow of water through the various conduits, the invention further contemplates the provision of water-impelling means for each conduit, whereby the flow of water through the same is materially assisted. The provision of such a current stabilizing means constitutes the principal object of the present invention.

In the accompanying single sheet of drawings forming a part of this specification, one illustrative embodiment of the invention is shown.

In these drawings:

FIG. 1 is a plan view showing a fragment of a large natural body of water with an island airport embodying the present invention operatively embodied therein;

FIG. 2 is a longitudinal sectional view taken substantially on the line 2—2 of FIG. 1; and FIG. 3 is a transverse sectional view taken substantially on the line 3—3 of FIG. 1.

Referring now to the drawings in detail and in particular to FIG. 1, a fragmentary shore line area of a large natural body of water such as a lake is designated by the reference numeral 10. An island airport 12 embodying the present invention is disposed within the the lake 10 in the vicinity of what will be considered to be the southern shore line 14 of the lake, and that the natural and gradual flow of water through the lake is from west to east as indicated by the arrows in FIG. 1.

Except for the current stabilizing means of the present invention, the island airport 12 is conventional and consists of a generally square airport foundation 16 which may have a lateral dimension on the order of 4 miles. The north, south, east and west sides of the foundation 16 are designated respectively by the reference numerals 20, 22, 24 and 26. The south side 22 of the foundation 16 is connected to the shore line 14 by an elongated causeway 28 which may have a length on the order of 1 mile. For exemplary purposes herein, the depth of the water in the vicinity of the airport 12 may be considered to be on the order of 40 feet.

Centrally disposed on the upper surface of the foundation 16 is the usual airplane runway area 30 (FIG. 1) embodying a series of four intersecting runways proper 32 and, surrounding the area 30, there may be the usual airport accommodations (not shown) such as administration buildings, towers, passenger terminals, automobile parking facilities, restauraunts, motels and other facilities too numerous to mention.

As shown in FIGS. 2 and 3, the airport foundation 16 embodies the usual central fill 42 which may be interrupted in any suitable manner to provide foundation structures for the various airport buildings, passenger or freight areaways and the like, and this fill is reinforced on the four sides thereof by structural steel piling 44, the latter in turn being reinforced by riprap 46. The lake bottom is designated by the reference numeral 48 and the lake water line by the dotted line wl.

Exhaustive investigation, including reduced or small scale tests, have shown that in the absence of the current stabilizing means of the present invention an airport such as the illustrated airport 12 will impede the normal flow of water along the lake and cause shore line sand build-up at the west shore line region 14w and the east shore line region 14e. It is predicted that, in the course of a few years, this sand build-up will result in a peninsula of sand at each such region extending out from the shore line for a quarter of a mile or more, as well as a complete filling in of the areas between the south edge 22 of the foundation 16 and the shore line 14.

According to the present invention, the airport foundation 16 is provided with a series of prestressed concrete conduits 50 which are of a diameter on the order of twenty feet and which extend completely through the foundation 16 from the west side 26 thereof to the east side 24. While seven equally spaced conduits 50 have been disclosed herein for exemplary purposes, it will be understood that a greater or a lesser number of such conduits may be employed if desired, depending upon the size of the foundation 12 and the rate of west to east water flow. The conduits 50 project through the piling 44 as shown in FIGS. 2 and 3 and are disposed at a level near the surface of the water. The conduits 50 are constructed from commercially available prestressed cast conduit sections which may be joined together in end-to-end fashion to produce a composite conduit of any desired length.

In order to assist the flow of water through the various conduits 50, motor and pump assemblies, each of which embodies a motor M and a driven pump P, are positioned on the foundation 16 near the entrance ends of the conduits 50. Each pump P is provided with a water intake line 51 and a pair of branch discharge lines 52, the latter projecting into adjacent conduits 50 and serving to discharge jets 54 of water longitudinally into such conduits as shown in FIG. 2.

From the above description it will be apparent that the provision of the various conduits 50 affords a means for conducting a relatively large quantity of water continuously through the airport foundation 16 so as to stabilize the normal water flow along the lake and thus prevent the aforementioned sand build-up along the shore line in the regions 14a and 14b.

If desired, additional conduits 50 may extend through the causeway 28 and be similarly positioned with respect to the water level.

The invention is not to be limited to the precise arrangement of conduits 50 shown in the accompanying drawing or described in this specification since variations in the number of conduits and in their spacing may be resorted to if desired. Therefore, only insofar as the invention is particularly pointed out in the accompanying claims is the same to be limited.

Having thus described my invention, what I claim and desire to secure by letters patent is:

1. In an island airport which projects outwardly from the shore line of a large body of flowing water and is positioned in a direction transversely of the normal direction of flow of water along the shore line, an airport foundation embodying a foundation fill which is bounded by structural piling reinforced by riprap, a narrow causeway connecting said foundation to the shore line, a plurality of prestressed cast concrete conduits projecting completely through said foundation, disposed in spaced apart parallel relationship and extending parallel to said shore line and generally in the direction of water flow in the body of water, and a plurality of prestressed cast concrete conduits projecting transversely through said causeway, all of said conduits being disposed in the vicinity of the level of water in said body and their number and size being such that they materially inhibit water flow obstruction by the airport and causeway and maintain water borne sediment flow along the shore line past and through the airport and causeway, and power-actuated means for assisting the flow of water through the first mentioned conduits and in the normal direction of water flow.

2. In an island airport which projects outwards from the shore line of a large body of flowing water and is positioned in a direction transversely of the normal direction of flow of water along the shore line, an airport foundation embodying a foundation fill which is bounded by structural piling reinforced by riprap, a plurality of prestressed cast concrete conduits projecting completely through said foundation, disposed in spaced parallel relationship and extending parallel to said shore line and generally in the direction of water flow in the body of water, said conduits being disposed in the vicinity of the level of water in said body and their number and size being such that they materially inhibit water flow obstruction by the airport and maintain water borne sediment flow along the shore line past and through the airport, and power-actuated means for assisting the flow of water through the conduits and in the normal direction of water flow.

3. An island airport as set forth in claim 2 and wherein said power-actuated means comprises a plurality of electrically-driven pumps mounted on said foundation, corresponding in number to and associated respectively with the foundation conduits, and having water inlets and water outlets, an inlet line extending between said body of water and the water inlet of each pump, and a jet-producing discharge line extending from the water outlet of each pump into the associated foundation conduit and effective to direct a jet of water into the conduit in the normal direction of water flow through the latter.

* * * * *